United States Patent [19]

Macky

[11] 4,229,981

[45] Oct. 28, 1980

[54] REVERSIBLE HAMMER DRILL

[75] Inventor: Barry L. Macky, Grafton, Wis.

[73] Assignee: Milwaukee Electric Tool Corporation, Brookfield, Wis.

[21] Appl. No.: 943,577

[22] Filed: Sep. 18, 1978

[51] Int. Cl.[3] .................... B23B 45/16; F16H 37/16; F16H 25/12; F16H 25/14

[52] U.S. Cl. .................................... 74/56; 74/22 A; 173/48

[58] Field of Search ................ 173/48; 74/22 A, 56, 74/22 R; 192/45

[56] References Cited

U.S. PATENT DOCUMENTS

| | | | |
|---|---|---|---|
| 1,656,054 | 1/1928 | Gage | 173/46 X |
| 1,664,625 | 4/1928 | Hulshizer | 192/45 X |
| 2,013,744 | 9/1935 | Curtis | 192/45 X |
| 2,889,711 | 6/1959 | Morris | 74/56 X |
| 3,190,417 | 6/1965 | Bacon | 192/45 |
| 3,563,352 | 2/1971 | Stibbe | 192/45 X |
| 3,730,281 | 5/1973 | Wood | 173/48 |
| 3,736,992 | 6/1973 | Zander et al. | 173/48 |
| 3,998,278 | 12/1976 | Stiltz et al. | 173/48 X |
| 4,066,136 | 1/1978 | Wanner et al. | 173/48 |

*Primary Examiner*—W. Carter Reynolds

[57] ABSTRACT

When the hammer drill spindle and chuck are driven forward with the mode selection collar positioned to allow axial movement of the chuck and spindle, the annular ratchet is driven by the spindle through a one way roller clutch so it rides up the sloping surfaces of the fixed annular ratchet and then drops off the tooth corners to deliver a hammer blow of a magnitude determined by the operator pushing on the tool. If the rotation is reversed the clutch prevents rotation of the clutch input and prevents injury to the operator. If the selection collar is moved to lock the lugs in the detent notch of the cam surface the drill can be rotated either direction with the hammer action always locked out.

4 Claims, 5 Drawing Figures

REVERSIBLE HAMMER DRILL

BACKGROUND OF THE INVENTION

One type of hammer drill employs a driven annular ratchet which by operator pressure can be forced against a fixed annular ratchet causing the driven ratchet to be moved axially until the teeth disengage and the housing moves forward to deliver an impact to the drill bit. The magnitude of the impact is a function of the pressure the operator applies to the tool. The hammer action can be locked out so the tool functions as a drill only.

A self tapping screw has been introduced for use in concrete and the like. Removal of such screws is difficult and is preferably done by a tool. This suggests a reversible hammer drill but if the motor is reversed with the hammer drill just described with the ratchet not locked out the ratchet can lock up and deliver full torque to the operator, likely breaking his wrist. With such potential it is scant comfort that locking the ratchet (hammer) out of action can avoid the problem. Therefore, there is need for a positive arrangement for preventing driving engagement of the ratchet during reverse operation.

SUMMARY OF THE INVENTION

The principal object of this invention is to provide a reversible hammer drill of the type using annular ratchets for developing the hammer action. This object is achieved by driving the ratchet which rotates with the tool spindle through a one way clutch so that the ratchet is disengaged from the spindle during reverse operation and no harm can be done even if the ratchets are engaged.

A further object of this invention is to provide a reversing hammer drill of the ratchet type provided with positive means for selectively locking the hammer out of action even if the drill rotation is reversed. The old lock-out would, if reversed, re-engage the hammer. By providing a positive detent action on the lock-out, selection is made positive and cannot be inadvertently reset to the hammer drive position.

Figure 1:
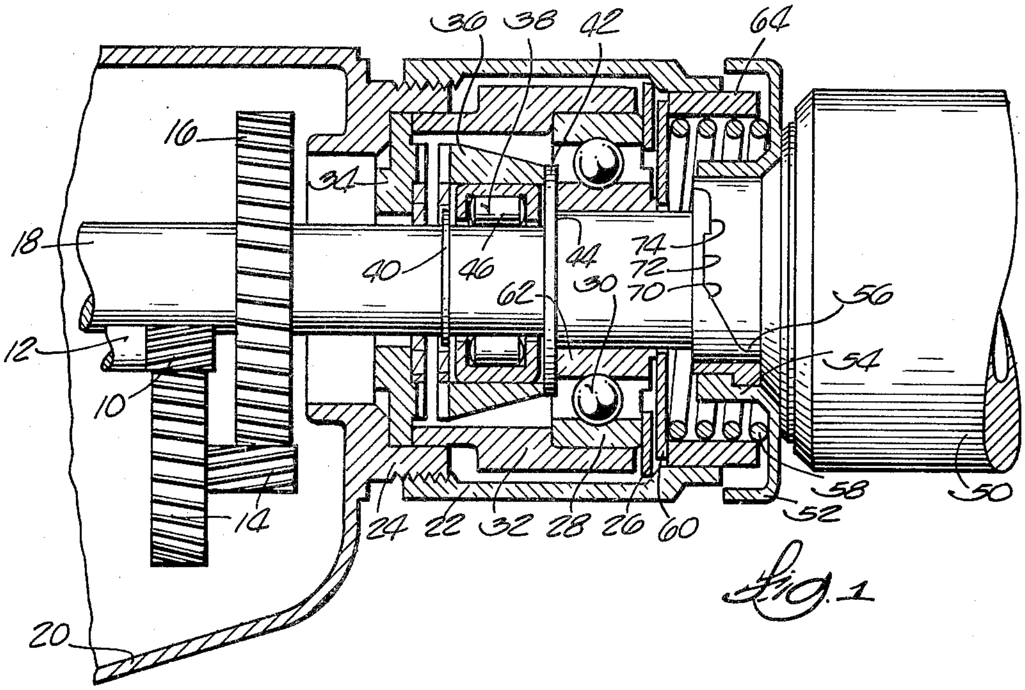
FIG. 1 is a partial vertical section through the improved hammer drill.

Pinion 10 on the end of the motor shaft 12 of the hammer drill drives reduction gears 14 to turn gear 16 fixed on spindle 18 in the gear case housing 20. Sleeve 22 is threaded onto the housing nose 24 to bear against washer 26 which in turn bears against the outer race 28 of bearing 30 retained in bearing housing 32, the left hand end of which bears against the annular ratchet 34 to fix it against rotation relative to the housing. The left end of spindle 18 is also journaled in a bearing (not shown) and it and bearing 30 allow limited axial motion of the spindle. The rotatable annular ratchet 36 has a one way roller type clutch 38 press fit in its inner diameter with the clutch fitting over spindle 18 and axially retained thereon by ring 40. The axial thrust of the rotatable ratchet 36 is taken against washer 42, the inner diameter of which bears against shoulder 44 on the spindle.

Figure 2:
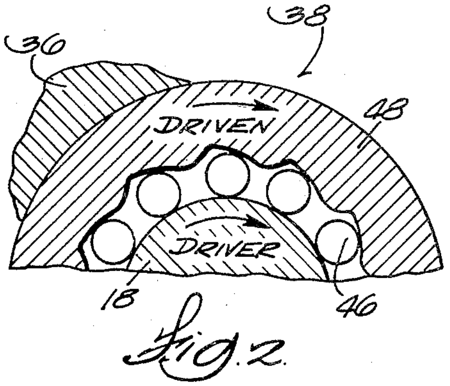
FIGS. 2 and 3 are schematic views showing the operation of the one way clutch.
Figure 3:
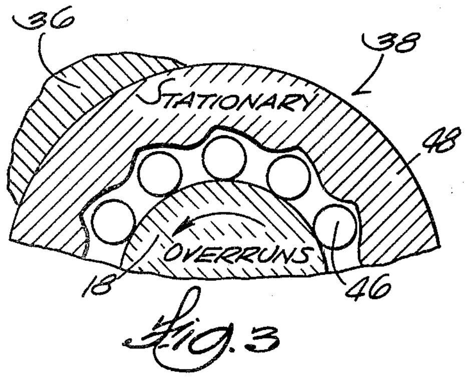

The roller type clutch is shown schematically in FIGS. 2 and 3. In FIG. 2 the shaft 18 is rotating clockwise and this will tend to pick up the rollers 46 to wedge them between the clutch housing 48 and the spindle 18, thus driving the housing 48 and, of course, the annular ratchet 36 in which the housing is press fit. If the spindle 18 is driven in the opposite direction as in FIG. 3, the rollers 46 do not wedge and, therefore, the spindle 18 can run freely while the housing 48 remains stationary.

The tool chuck 50 is threaded on the right hand end of the spindle. A collar 52 has two inwardly projecting lugs 54 spaced 180° apart which can be selectively aligned with the slots 56 spaced 180° apart on the right hand end of spindle 18. When the collar is so positioned the spindle 18 may slide axially in its support bearings to allow the face of ratchet 36 to come into engagement with the face of the stationary ratchet provided the user pushes on the tool. If the user does not push on the tool, the spring 58 compressed between the inside of the collar 52 and washer 60, the inside of which bears against the inner race 62 of bearing 30, will push the collar and spindle to the right to the position illustrated, thus automatically disengaging the ratchet. The felt washer 64 is employed to keep dust out of the assembly.

Figure 4:
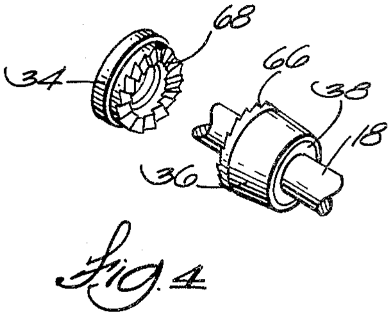
FIG. 4 is a perspective view of the ratchet mechanism.
Figure 5:
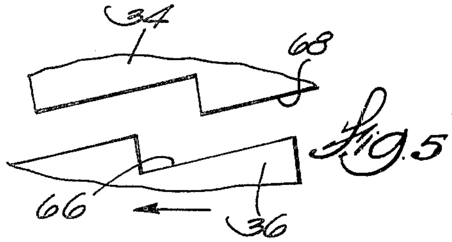
FIG. 5 is a schematic view illustrating the operation of the ratchet.

When the spindle is free to move axially as just described and the operator presses on the tool, the ratchet faces are brought into contact. Details of the ratchet faces are shown in FIGS. 4 and 5. It will be noted, particularly in FIG. 5 that when the teeth 66 on the rotating ratchet 36 slide over the teeth 68 on ratchet 34, there is a camming action pushing the rotating ratchet axially away from the stationary ratchet and as soon as the teeth on the movable ratchet get clear of the teeth on the fixed ratchet, operator pressure will cause the tool housing to move to the right (FIG. 1) relative to the ratchet 36 and deliver a blow to the spindle and hence the drill bit, with the magnitude of the blow being determined by the degree of operator pressure. It will be equally apparent that if the rotation of the ratchet 36 were reversed without provision of the one way clutch 38, there would be a locking angle delivering severe torque back to the operator with likelihood of injury. However, with the provision of the one way clutch 38, the reversible motor drive can be reversed and the formerly rotating clutch 36 becomes stationary and nothing happens if the operator bears on the tool hard enough to engage the ratchet teeth.

Under some conditions, it is desired to lock out the hammer action. This is provided for by turning the lugs on locking collar 52 against the camming surface 70 formed on the right hand portion of the spindle 18 to lead to the flat circumferential surface 72 and, this in turn, leads to a notched portion 74. When the lugs 54 bear against the surface 72 rearward movement of the spindle is restricted and the hammer action is prevented but could be restored inadvertently, leading to a dangerous condition. When the lugs 54 are turned all the way into the notch 74, the hammer action is permanently locked out until the collar is depressed against the force of spring 58 far enough for the lugs to clear notch 74 and then rotate it back to position the lugs 54 in the slots 56. This ability to lock out the hammer action is important since, without the provision of the notch 74, if the operator has previously been operating in the forward direction and reverses, the reversal would cause the lugs to become aligned with the slots and the operator would have a hammer action on subsequent forward operation even though he had not desired that. Thus, with this arrangement, when the operator locks out the hammer action, it remains locked out regardless of the direction of rotation and must be deliberately restored.

I claim:

1. A rotary hammer drill of the type having a drive spindle mounted in the housing for limited axial movement, a first ratchet member mounted on the spindle for axial movement with the spindle, a second ratchet member fixed in the housing, said ratchet members having confronting faces having complimentary ratchet faces which cam the first member from the second member when the spindle is rotated in the forward direction, characterized in that the spindle is driven by a reversible motor and a one way clutch is operatively connected between the spindle and said first ratchet member to drive the first ratchet member in the forward direction only.

2. A hammer drill according to claim 1 in which the one way clutch is of the camming-roller type and is pressfit inside the first ratchet member.

3. A hammer drill according to claim 1 including means for locking the spindle against axial motion sufficient to engage the ratchet members.

4. A hammer drill according to claim 3 in which said means comprises, a cam surface on the spindle, a manually operable collar having an internal lug engageable with said cam surface, a spring biasing the collar to a position in which the lug is disengaged from the cam surface and the spindle is free to move axially, said cam surface being operative to force the lug and collar rearwardly as the collar is rotated until the lug rests against a circumferential surface of the cam and the rearward motion of the spindle is restricted, said circumferential cam surface being characterized by provision of a notched portion capturing the lug regardless of the direction of rotation of the spindle.

* * * * *